(12) United States Patent
Lunzman et al.

(10) Patent No.: US 7,549,498 B2
(45) Date of Patent: Jun. 23, 2009

(54) CONTROL FOR AN ALL-WHEEL-DRIVE VEHICLE

(75) Inventors: Stephen Victor Lunzman, Chillicothe, IL (US); John Andrew Yeoman, Dunlap, IL (US); Sean Wesley Johnson, Newark, IL (US); Bryan L. Fredrickson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 282 days.

(21) Appl. No.: 10/950,540

(22) Filed: Sep. 28, 2004

(65) Prior Publication Data

US 2006/0065465 A1    Mar. 30, 2006

(51) Int. Cl.
*B60K 17/354* (2006.01)
(52) U.S. Cl. .................................. 180/242; 180/307
(58) Field of Classification Search ................. 180/242, 180/243, 305, 307, 308
See application file for complete search history.

(56) References Cited

U.S. PATENT DOCUMENTS

| | | | | |
|---|---|---|---|---|
| 4,444,286 A * | 4/1984 | Hawkins et al. | ............. | 180/243 |
| 5,147,010 A * | 9/1992 | Olson et al. | ................. | 180/308 |
| 5,348,115 A | 9/1994 | Devier et al. | | |
| 5,361,208 A * | 11/1994 | Olson et al. | ................. | 180/243 |
| 5,553,453 A * | 9/1996 | Coutant et al. | .............. | 180/307 |
| 5,553,517 A * | 9/1996 | Yesel et al. | .................. | 180/243 |
| 5,775,453 A * | 7/1998 | Williams et al. | ............ | 180/197 |
| 6,119,802 A * | 9/2000 | Puett, Jr. | ...................... | 180/242 |
| 6,164,402 A * | 12/2000 | Hastreiter | .................... | 180/243 |
| 6,260,647 B1 * | 7/2001 | Calamari et al. | ............ | 180/242 |
| 6,367,572 B1 * | 4/2002 | Maletschek et al. | ......... | 180/305 |
| 6,508,328 B1 | 1/2003 | Kenyon et al. | | |
| 2002/0100630 A1 | 8/2002 | Evans et al. | | |

OTHER PUBLICATIONS

Wikipedia, definition of the term 'Clutch' (http://en.wikipedia.org/wiki/Clutch), retrieved Feb. 22, 2008, three pages.*

* cited by examiner

*Primary Examiner*—Frank B Vanaman
(74) *Attorney, Agent, or Firm*—Finnegan, Henderson, Farabow, Garrett & Dunner

(57) ABSTRACT

A method is provided for controlling an all-wheel-drive vehicle. The method includes providing an aggression signal and determining a desired speed ratio based on the aggression signal. An output speed signal corresponding to the determined desired speed ratio is generated.

11 Claims, 2 Drawing Sheets

CONTROL FOR AN ALL-WHEEL-DRIVE VEHICLE

TECHNICAL FIELD

The present disclosure is directed to a control system and method for an all-wheel-drive vehicle. More particularly, the disclosure relates to a system and method for controlling an all-wheel-drive vehicle in a creep mode.

BACKGROUND

Many work machines are required to operate on uneven terrain or in other poor footing conditions. To provide better traction, work machines such as motor graders are often equipped with an all-wheel-drive (AWD) system. A typical AWD vehicle has rear wheels driven to propel the vehicle and front wheels used for steering. In a poor footing condition, the front wheels of the AWD vehicle can also be driven to increase traction of the vehicle. For example, a motor grader may be operated in an AWD mode to obtain maximum traction when grading on a side slope or removing snow from a roadway.

To avoid unnecessary wear of AWD components and to minimize power loss, AWD vehicles can be operated in a two-wheel-drive mode. When operating a motor grader, it may be desirable to propel the motor grader only by its front wheels at a slow speed so that its rear wheels do not disturb the fine finished graded surface. Such an operating mode in a motor grader is typically called a creep mode.

In the creep mode, however, it is difficult to control the speed of the vehicle. A known motor grader allows an operator to control the speed in the creep mode by varying engine speed (RPM). For example, U.S. Pat. No. 6,508,328 discloses a motor grader that controls vehicle speed in a creep mode based on engine speed control by an operator. However, these known motor graders do not control the ground speed independently of the engine speed, and they do not allow the engines to operate at full capacity. Furthermore, those motor graders require that an operator perform a difficult task of modulating engine speed by an accelerator pedal. As a result, those AWD vehicles can be operated inefficiently.

The present control system is directed to solving one or more of the shortcomings associated with prior art designs and providing a system and method for controlling an AWD vehicle with better control and efficiency.

SUMMARY OF THE INVENTION

In one aspect, a method is provided for controlling an all-wheel-drive vehicle. The method includes providing an aggression signal and determining a desired speed ratio based on the aggression signal. An output speed signal corresponding to the determined desired speed ratio is generated.

In another aspect, a control system is provided for an all-wheel-drive vehicle. The control system includes an aggression input unit and a controller coupled to the aggression input unit. The controller is configured to determine a desired speed ratio based on a signal from the aggression input unit.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
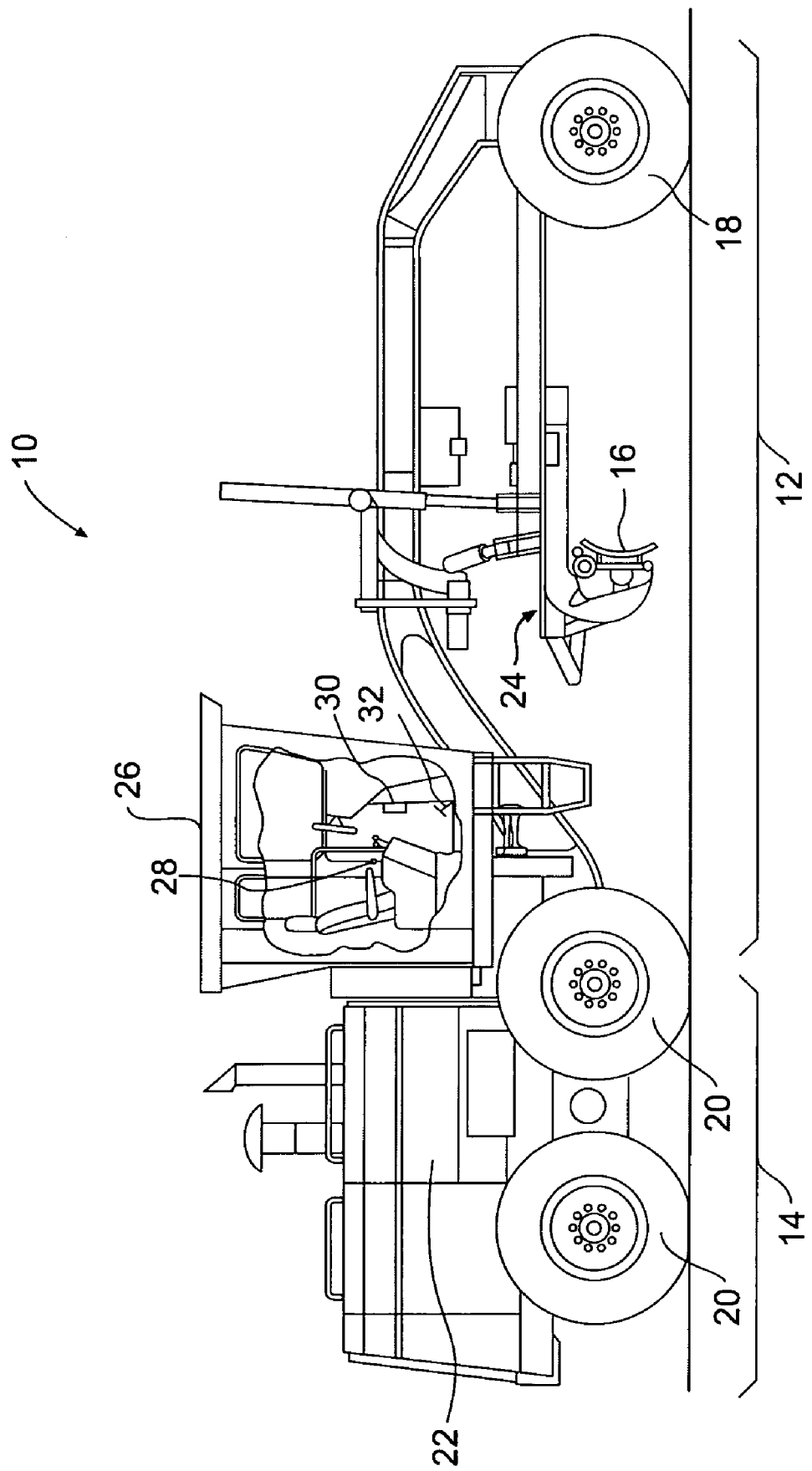
FIG. 1 is a diagrammatic representation of a motor grader with a control system according to one exemplary embodiment.

As shown in FIG. 1, an AWD vehicle may be a motor grader 10 typically used for grading grounds to provide a finished earth surface. While the control system and method is described in reference to a motor grader in this disclosure, the control system and method is not limited to this application.

The motor grader 10 includes a front frame portion 12, a rear frame portion 14, and a blade 16 provided in the front frame portion 12. The front and rear frame portions 12, 14 are supported by front and rear wheels 18, 20. The front and rear wheels 18, 20 work independently of one another. The blade 16 is used to move earth or other materials to provide a grading surface. A power source, such as an engine 22, is provided to generate power to propel the motor grader 10. The engine 22 may be mounted on the rear frame portion 14.

In this exemplary embodiment, the motor grader 10 may include a linkage assembly 24 that allows the blade 16 to be moved to various positions relative to the motor grader 10. The blade may be placed in a fixed position or variable positions during earth moving operations.

As illustrated in FIG. 1, the motor grader 10 also has an operator cab 26 that is equipped with control levers and dials necessary to operate the motor grader 10. In the motor grader 10 shown in FIG. 1, a gear shift lever 28 is provided in the operator cab 26. The gear shift lever 28 may be a three-position lever having forward, neutral, and reverse positions to propel the motor grader 10 in a desired direction. The gear shift lever 28 may be a multi-position lever that is actuated to select the direction and gear to propel the motor grader 10 in a desired direction at desired speed.

The operator cab 26 may also have an AWD control mode selector 30. In this embodiment, the mode selector 30 may be used by the operator to select an off mode, an automatic mode, or a creep mode. In the off mode, the AWD system of the motor grader 10 is disengaged. In the automatic mode, the front wheel speed is controlled based on the operator's desired speed of the rear wheels. The operator may use the gear shift lever 28 to shift the motor grader 10 in the forward and reverse position with infinitely variable speeds. When the motor grader 10 is used to provide a fine graded surface, the creep mode may be selected. In the creep mode, the motor grader is driven at a slow creeping speed by the front wheels 18.

Figure 2:
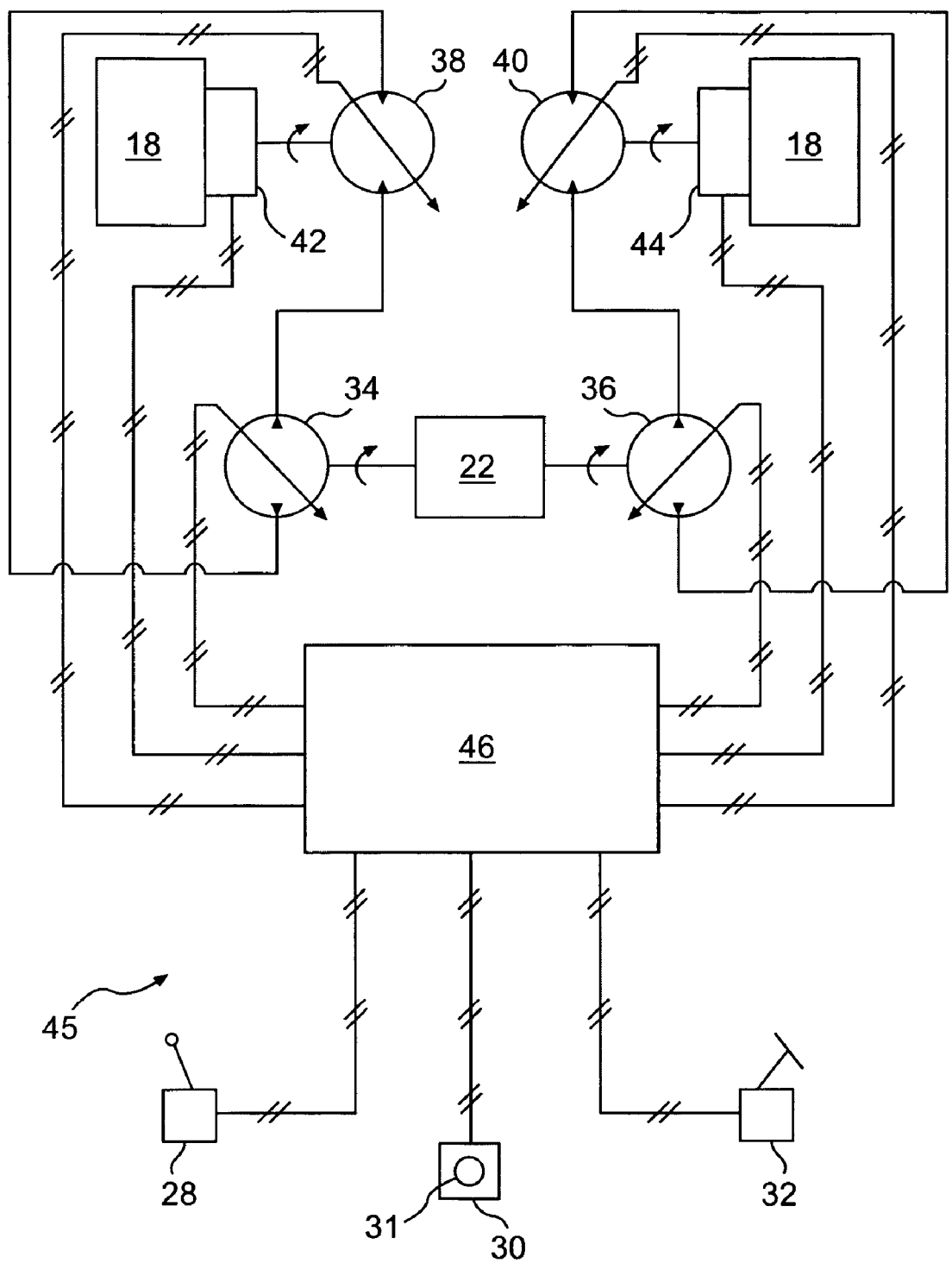
FIG. 2 is a schematic representation of the control system of the motor grader of FIG. 1.

The mode selector 30 may have an aggression input unit, such as an aggression control dial 31 (See FIG. 2). In the automatic mode, the aggression control dial 31 may be used to set a level of aggression of the front wheel drive. By adjusting the level of aggression, the front wheels 18 can be set at a desired speed with respect to the rear wheels 20. In the creeping mode, the aggression control dial may be used to control ground speed of the motor grader 10 without altering the engine speed. The operator cab 26 also has an inching pedal 32 that is used to modulate the ground speed of the motor grader 10 while in the creep mode.

FIG. 2 schematically illustrates the control system associated with the front wheels 18 of the motor grader. While the system associated with the rear wheels 20 is not illustrated in the figure, a suitable system is also provided for the rear wheels 20.

In the exemplary embodiment shown in FIG. 2, the motor grader includes an engine 22 and left and right variable displacement pumps 34, 36 coupled to and driven by the engine 22. The motor grader may also have left and right hydraulic motors 38, 40 hydraulically coupled to and driven by the left and right pumps, 34, 36, respectively. The left and right hydraulic motors 38, 40 in this embodiment have a variable displacement capability and can be operated independently from each other. The motor grader also may have left and right clutches 42, 44. The clutches 42, 44 are provided between the hydraulic motors 38, 40 and the front wheels 18. In one embodiment, each of the right and left clutches has forward, neutral, and reverse positions.

As shown in FIG. 2, a control system 45 of the motor grader includes a controller 46. The controller 46 may be electrically connected to the gear shift lever 28, the mode selector 30, and the inching pedal 32 to receive input signals from each of them. The controller 46 may also be electrically connected to the right and left variable displacement pumps 34, 36, and the right and left hydraulic motors 38, 40 to control their displacements. As shown in FIG. 2, the controller 46 may also be electrically connected to the right and left clutches 42, 44 to select a desired clutch position.

By selecting the forward, neutral, or reverse position of the gear shift lever 28, the operator places the clutches 42, 44 in the corresponding position to propel the motor grader 10 in a desired direction. In this exemplary embodiment, the operator selects one of the forward, neutral, and reverse modes.

The operator manipulates the mode selector to choose one of the off mode, the automatic mode, and the creep mode. The mode selector 30 is provided with the aggression control dial 31. In the creep mode, the operator may turn the aggression dial 31 to select a desired speed ratio of the front wheels 18. By manipulating the aggression control dial 31, the operator can control the ground speed of the motor grader 10 in the creep mode. In addition, the inching pedal 32 can be used to decrease the vehicle speed proportionally as the pedal 32 is pressed. Therefore, the control system 45 allows the operator to control the ground speed of the motor grader 10 without adjusting the engine speed. In one exemplary embodiment, the engine speed may be kept at the maximum operating RPM to provide sufficient power to accommodate a large load on the blade 16. At the same time, the operator may be able to adjust the engine speed to control the creep speed.

In the embodiment shown in FIG. 2, the controller 46 may be preprogrammed with a map or table that contains values for a desired speed ratio with respect to a position of the aggression dial. Such a map or table may be created prior to the operation of the motor grader 10, for example, during either a test run of the motor grader 10 or a lab test, and may be prestored in a memory located in the controller 46. In another embodiment, the controller 46 may store mathematical equations that provide a desired speed ratio with respect to a position of the aggression dial.

Also, the operator may modify creep speed by modulating the inching pedal 32.

INDUSTRIAL APPLICABILITY

Referring to FIGS. 1 and 2, the operator of the motor grader 10 controls its ground speed by manipulating the aggression control dial 31 of the mode selector 30 when the motor grader 10 is operating in the creep mode. When the motor grader 10 is operating in the creep mode, the controller 46 is ready to receive the aggression signal from the aggression control dial 31. Upon receipt of the aggression signal, the controller 46 determines a desired speed ratio that corresponds to the selected level of aggression by using a map, table, or equation prestored in the controller 46.

After determining the desired speed ratio, the controller 46 may multiply the determined desired speed ratio by an input from the inching pedal 32 to obtain an output signal. Based on the output signal, the variable displacement pumps 34, 36 provide hydraulic flow to the motors 38, 40 to propel the motor grader 10 at a desired creeping speed. The displacements of the pumps 34, 36 and motors 38, 40 may be determined by an open-loop or closed-loop algorithm. During this operation, while not required, the engine speed may be kept at a constant speed, such as the maximum operating RPM. Thus, the ground speed may be controlled independently of the engine speed and may allow the engine speed to be at full capacity, even though moving slowly on the ground. These features may allow an operator to more efficiently control the AWD machine.

It will be apparent to those skilled in the art that various modifications and variations can be made in the disclosed system and method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A control system for an all-wheel-drive vehicle having independently driven front and rear wheels, comprising:
    a mode selector for selecting between an all-wheel drive mode and a creep mode, only the front wheels being configured to be driven in the creep mode;
    an aggression input unit for providing a signal in both the all-wheel drive mode and the creep mode; and
    a controller coupled to the aggression input unit, the controller being configured to control a speed of the front wheels based on a speed of the rear wheels and a desired speed ratio between the front and the rear wheels in the all-wheel drive mode, the speed ratio corresponding to the signal in the all-wheel drive mode,
    the controller further being configured to control the speed of the front wheels based on the signal from the aggression input unit independent of an engine speed of the vehicle and the speed of the rear wheels in the creep mode.

2. The control system of claim 1, further including an inching pedal input unit coupled to the controller, the controller being configured to modify the speed of the front wheels based upon a position of the inching pedal input unit in the creep mode.

3. The control system of claim 1, wherein the controller includes a look-up table for the determination of the desired speed ratio.

4. The control system of claim 1, wherein the controller includes an equation for the determination of the desired speed ratio.

5. The control system of claim 1, further including a three-position selector coupled to the controller for selecting a forward position, a neutral position, or a reverse position of the all-wheel-drive vehicle.

6. An all-wheel-drive vehicle, comprising:
    a power source;
    a first pair of wheels;

a second pair of wheels driven independently from the first pair of wheels;

a pump coupled to the power source, the pump being configured to drive the first pair of wheels;

an aggression input unit for providing a signal in both an all-wheel drive mode and a creep mode; and a controller coupled to the aggression input unit, the controller being configured to control a speed of the first pair of wheels based on a speed of the second pair of wheels and a speed ratio between the first and the second pair of wheels in the all-wheel drive mode, the speed ratio corresponding to the signal in the all-wheel drive mode, the controller further being configured to control the speed of the first pair of wheels based on the signal from the aggression input unit independent of an engine speed of the vehicle and the speed of the second pair of wheels in the creep mode and to provide an output speed signal corresponding to the desired speed ratio to modulate a displacement of the pump.

7. The all-wheel-drive vehicle of claim 6, further including an inching pedal input unit coupled to the controller, the controller being configured to modify the speed of the first pair of wheels based upon a position of the inching pedal input unit in the creep mode.

8. The all-wheel-drive vehicle of claim 6, wherein the controller includes a look-up table for the determination of the desired speed ratio.

9. The all-wheel-drive vehicle of claim 6, wherein the controller includes an equation for the determination of the desired speed ratio.

10. The all-wheel-drive vehicle of claim 6, further including a mode selector coupled to the controller for selecting the all-wheel-drive mode or the creep mode.

11. The all-wheel-drive vehicle of claim 6, further including a three-position selector coupled to the controller for selecting a forward position, a neutral position, or a reverse position of the wheel drive vehicle.

* * * * *